(12) United States Patent
Meissner

(10) Patent No.: US 7,584,035 B2
(45) Date of Patent: Sep. 1, 2009

(54) METHOD FOR MONITORING THE PERFORMANCE RELIABILITY OF A CONTROL UNIT AND DIAGNOSTIC DEVICE

(75) Inventor: Peter Meissner, Kernen (DE)

(73) Assignee: Robert Bosch GmbH, Stuttgart (DE)

( * ) Notice: Subject to any disclaimer, the term of this patent is extended or adjusted under 35 U.S.C. 154(b) by 384 days.

(21) Appl. No.: 10/553,502

(22) PCT Filed: Feb. 17, 2004

(86) PCT No.: PCT/DE2004/000285

§ 371 (c)(1),
(2), (4) Date: Aug. 25, 2006

(87) PCT Pub. No.: WO2004/091979

PCT Pub. Date: Oct. 28, 2004

(65) Prior Publication Data

US 2007/0043485 A1      Feb. 22, 2007

(30) Foreign Application Priority Data

Apr. 15, 2003   (DE) ................................ 103 17 212

(51) Int. Cl.
*B60R 21/01*     (2006.01)
*G05B 9/00*      (2006.01)

(52) U.S. Cl. .............................. 701/45; 701/29; 701/46; 180/268; 280/734; 700/79; 700/80; 340/438

(58) Field of Classification Search .................... 701/45, 701/46; 180/268; 280/734; 700/79–80; 340/438
See application file for complete search history.

(56) References Cited

U.S. PATENT DOCUMENTS 3,714,627 A      1/1973   Dillman et al.
4,958,851 A *    9/1990   Behr et al. .................. 280/735

(Continued)

FOREIGN PATENT DOCUMENTS

DE           32 49 367       5/1988

(Continued)

*Primary Examiner*—Thomas G Black
*Assistant Examiner*—Lin B Olsen
(74) *Attorney, Agent, or Firm*—Kenyon & Kenyon LLP

(57) ABSTRACT

The present arrangement provides a method for monitoring the performance reliability of a control unit and/or at least one sensor of a safety device for the protection of vehicle occupants, comprising the steps that a negative acceleration or velocity caused by an impact, in particular, be recorded; a value for the impact severity be derived from the recorded acceleration or velocity; and the value for the impact severity be compared to a predefined threshold value. If the value for the impact severity exceeds the predefined threshold value, an error-function signal will be output, which indicates that the proper functioning can no longer be ensured for the control unit and/or for at least one sensor. The present arrangement also relates to a diagnostic device for such a method.

11 Claims, 2 Drawing Sheets

U.S. PATENT DOCUMENTS

| | | | | |
|---|---|---|---|---|
| 5,387,819 | A * | 2/1995 | Ueno et al. | 307/10.1 |
| 5,424,583 | A * | 6/1995 | Spies et al. | 307/10.1 |
| 5,749,059 | A * | 5/1998 | Walton | 701/45 |
| 5,809,439 | A * | 9/1998 | Damisch | 701/45 |
| 6,175,794 | B1 * | 1/2001 | Muraoka | 701/45 |
| 6,312,013 | B1 * | 11/2001 | Baur et al. | 280/735 |
| 2002/0161457 | A1 * | 10/2002 | Hershey et al. | 700/21 |
| 2002/0169535 | A1 * | 11/2002 | Imai et al. | 701/45 |
| 2008/0147280 | A1 * | 6/2008 | Breed | 701/46 |

FOREIGN PATENT DOCUMENTS

| | | |
|---|---|---|
| DE | 37 06 765 | 9/1988 |
| DE | 37 36 294 | 5/1989 |
| DE | 43 02 399 | 3/1994 |
| DE | 44 39 886 | 9/1995 |
| DE | 197 57 118 | 7/1999 |
| EP | 0 936 111 | 8/1999 |

* cited by examiner

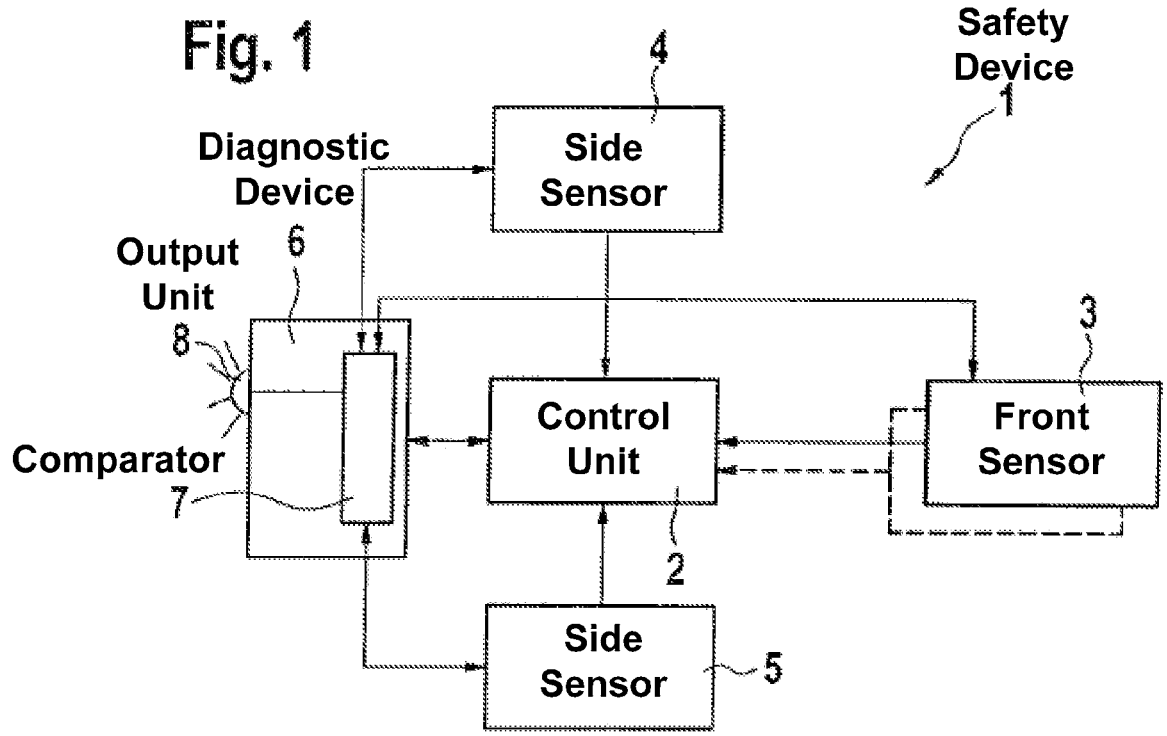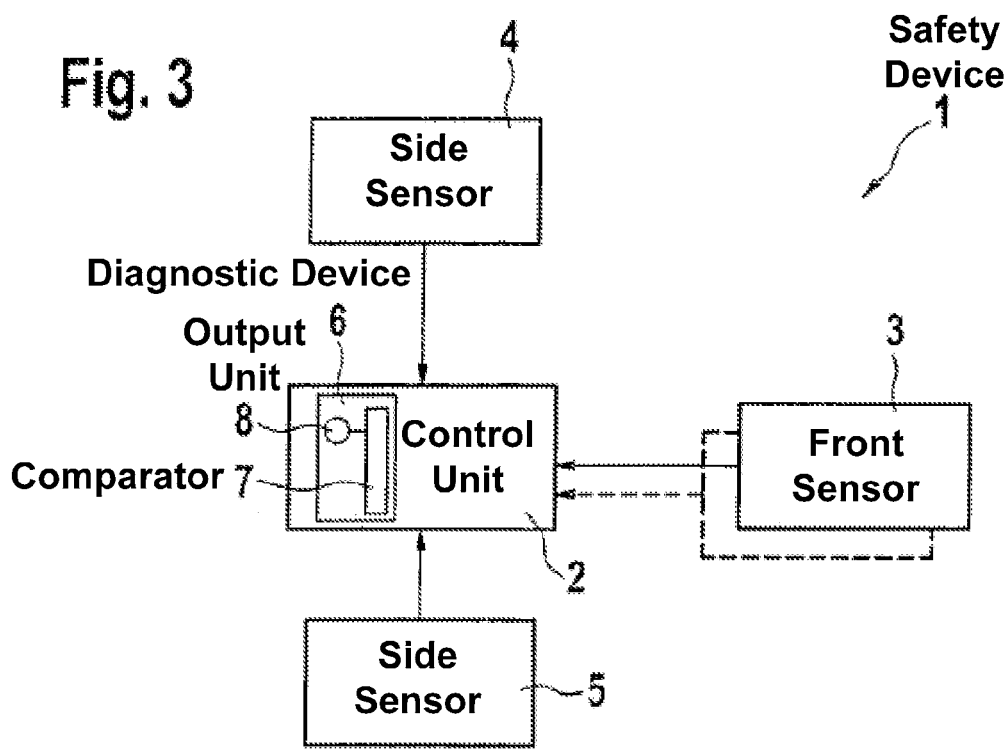

METHOD FOR MONITORING THE PERFORMANCE RELIABILITY OF A CONTROL UNIT AND DIAGNOSTIC DEVICE

FIELD OF THE INVENTION

The present invention relates to a method for monitoring the performance reliability of a control unit and/or at least one sensor of a safety device for the protection of vehicle occupants, as well as a diagnostic device.

BACKGROUND INFORMATION

Safety devices for the protection of vehicle occupants such as front and side airbags, rollover bars, belt tighteners etc., are standard equipment in motor vehicles manufactured these days. Typically, such safety devices are made up of a multitude of sensors for detecting a crash by recording a crash-related negative acceleration or velocity, and a control unit for the safety device, which analyzes a value derived from the crash. If a specific threshold value, which points to the presence of a crash, is detected, the control unit triggers the corresponding restraining means.

As is often the case in electronic devices, there is the risk in control units and/or in sensors as well that they will not function or will not function properly, Which, however, must be avoided under all circumstances when safety devices are involved. Modern safety devices for the protection of vehicle occupants therefore include devices for checking the correct functioning of the sensors and/or the control unit, thereby detecting a malfunction as early as possible.

For the most reliable operation of a safety device in a motor vehicle it is of crucial importance that the crash sensors (such as acceleration sensors, deformation sensors) and the corresponding control unit operate without faults at all times. If the performance reliability of a crash sensor or a control unit is interrupted, this must be signaled immediately so that the required repair and exchange may be initiated.

Safety-relevant electronic devices to which the life of vehicle occupants is entrusted in a dangerous situation, must have extraordinary performance reliability. In most cases such high performance reliability can be guaranteed only if all components of the safety device are able to be checked with respect to their functioning.

In the method for checking an acceleration sensor of the safety device, a test signal is applied to the particular acceleration sensor whose proper functioning is to be tested. The answer signal transmitted by the acceleration sensor in response to the test signal will then be utilized as a measure for ascertaining the functioning of the acceleration sensor. These function tests of the acceleration sensor are carried out continuously during normal operation of the safety device, for instance when starting the vehicle.

As far as the general background of the test for correct functioning of acceleration sensors is concerned, reference is made to the laid-open documents German Published Patent Application No. 44 39 886, German Published Patent Application No. 37 06 765, German Published Patent Application No. 37 36 294, German Published Patent Application No. 43 02 399, German Published Patent Application No. 197 57 118 as well as the German patent document German Patent No. 32 49 367.

In control units for safety devices for the protection of vehicle occupants and their remote sensors there is also always the risk that they get damaged in a crash. This type of damage depends mostly on the severity of the impact. If the impact, and thus the deformation, is severe enough to deform the location at which the control unit or the appropriate sensors is affixed, the impact may have damaged the control unit and/or the sensors as well. Such damage may be so severe that the control unit or the sensors are no longer operable. In this case these devices would have to be exchanged. Despite an impact and a resulting deformation it is entirely possible, however, that the control unit and individual sensors are still working properly, so that there is no need to replace them. Furthermore, it is possible that the control device or the sensors have indeed been damaged slightly by the impact, but in the beginning are still fully functional nevertheless. However, there is the risk in this case that these devices lose their functionality over the course of time, for instance due to mechanical influences such as vibrations, temperature or the entry of moisture, or stop functioning in another accident. In this case these devices should have been exchanged after the original impact.

However, it is very difficult to distinguish the mentioned scenarios from each other. In particular in the case of a still operative devices it is not easy without further measures to determine whether and when this unit will possibly malfunction.

In control units for safety devices, in particular in the case of airbag control units, these are therefore exchanged, typically after one to five crashes during which the control unit has triggered at least one restraining means. In the case of crash sensors, there are often no regulations whether and, if so, under what circumstances these should be exchanged in the event of a crash.

A related problem also arises from the fact that, especially in service facilities with less experienced staff, all control units and crash sensors are often exchanged because of a crash although some of them are still working perfectly. As an alternative, there is also the possibility that, for instance, a fully functioning control unit is exchanged, whereas an acceleration sensor, for example, which no longer provides full operability, is not replaced.

SUMMARY OF THE INVENTION

The principle on which the present invention is based is that the control unit or a comparable device decides on its own whether the control unit should be exchanged in the aftermath of a crash. In addition or as an alternative, the control unit or a comparable device may also decide whether and, if so, which sensors should be exchanged in the event of a crash. This minimizes the repair costs resulting from a crash since only control units or sensors that are not fully functional are replaced, whereas the operative devices may continue to be used. This also minimizes the risk of a control unit or a sensor failing in a crash.

An additional advantage of the method according to the present invention is that this functionality must be described in the corresponding manuals and system specifications of the vehicle manufacturer, the service facility testing devices and vehicle manuals, which leads to high transparency and ensures excellent verifiability of the method.

In one very advantageous embodiment a value for the impact severity is calculated not only for each control unit but for each sensor as well, this value being calculated in a device-specific manner. The individually calculated value for the impact severity of the control unit or sensor in question will then be compared to a predefined threshold value. As a rule this threshold value is also predefined specifically for the individual control unit or the individual sensor. This means that, depending on the location of the individual control unit or the sensor inside the motor vehicle, and depending on its mechanical properties, a threshold value adapted thereto may be predefined in each case. Furthermore, the threshold value naturally may also depend on other parameters such as the mechanical stability of the particular device. In a further advantageous refinement, information from several preceding impacts is also able to be taken into consideration when determining the value for the impact severity of the control unit. In particular, this functionality provides, for instance, that preceding impacts in which the control unit has triggered will be taken into account as well when determining the impact severity of a new impact. As a result, a detected renewed impact may be assigned a relatively higher value for the impact severity than an equally heavy impact which was not preceded by an earlier impact, this being accomplished by scaling with a correction factor, for instance. As an alternative, it is also conceivable that the predefined threshold value is lowered in a repeat impact. In an advantageous manner, this refinement according to the present invention thus takes the possibility into account that the control unit has sustained damage in an earlier impact already.

In another advantageous embodiment, the absolute value of the predefined threshold value is lowered with increasing operating time of the safety device. This takes the fact into consideration that, with increasing operating time, the control unit or the sensors no longer work as well compared to their original state, for instance, even without impact and thus without resulting damage, due to external influences, such as vibrations, temperature influences, improper handling etc.

One advantageous refinement uses measurements from crash tests and calculations and findings derived therefrom to determine the predefined threshold value. Vehicle manufacturers are able to define for each model variant how high the predefined threshold should be selected as a function of the particular velocity, vehicle impact, impact type etc. For instance, prior to the initial operation of a safety device in a motor vehicle, a multitude of crash tests must be carried out to test this safety device. Such crash tests then yield empirical values or other findings for the predefined threshold at which the corresponding sensors and control units do stay operative after a crash, but it turns out ultimately that the performance reliability can no longer be ensured in long-term testing.

In an advantageous refinement, a testing device of a service center reads out and analyzes the output function-error signal. In addition or as an alternative, this may also be done by the control unit itself.

In the latter case the diagnostic device will require an output unit, which informs the vehicle user of an occurring error signal. This output unit may be realized in the form of a blinking light, for instance. Furthermore, it may of course also be provided in the functionality of an onboard computer installed in the motor vehicle. In an advantageous refinement it is possible to infer from the error signal which control unit or which sensor is no longer fully functioning.

In a very advantageous embodiment, the functionality of the diagnostic device may be implemented in the control unit itself, either entirely or at least partially. In the event that the measured or calculated value for the impact severity exceeds the predefined threshold value, the diagnostic device emits a function-error signal either to a service station testing device or to a program-controlled unit. In an advantageous manner a control-unit-typical or sensor-typical threshold value is provided for this control unit or for each sensor. This predefined threshold value is lower than a threshold value specified for the triggering of a restraining means.

BRIEF DESCRIPTION OF THE DRAWINGS

FIG. 1 shows a block diagram of a safety device in a motor vehicle having the diagnostic device according to the present invention.

FIG. 3 shows a block diagram of a second embodiment of a diagnostic device according to the present invention.

DETAILED DESCRIPTION

Figure 2:
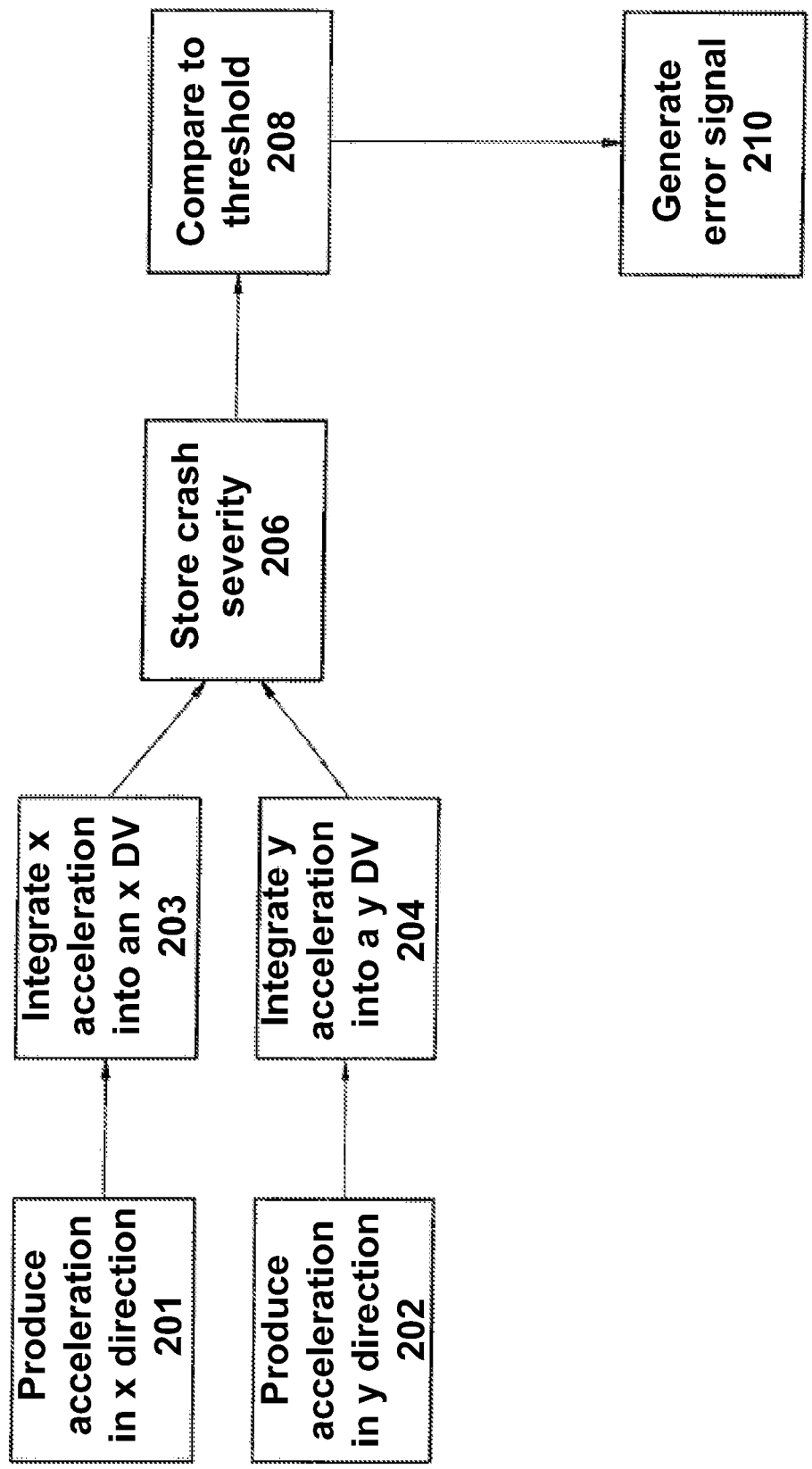
FIG. 2 shows a sequence of a method according to the present invention, on the basis of a block diagram.

Unless specifically mentioned otherwise, identical or functionally equivalent elements have been provided with matching reference numerals in the figures of the drawing.

FIG. 1 shows the block diagram of a safety device having the diagnostic device according to the present invention.

Reference numeral 1 in FIG. 1 denotes the safety device. Here, safety device 1 is embodied as electronic restraining means, such as an airbag system. The safety device includes an airbag control unit 2 as well as a multitude of sensors 3 to 5. In the case at hand, safety device 1 has one or more front sensors 3 and side sensors 4, 5 although it is also possible to provide rear sensors as well. The present invention includes a diagnostic device 6. Diagnostic device 6 communicates bidirectionally, both with control unit 2 and sensors 3 to 5. Instead of a single diagnostic device 6 it would also be conceivable, of course, to provide each control unit 2 or each sensor 3 to 5 with its own diagnostic device 6. It would likewise be possible to implement the functionality of diagnostic device 6 into control unit 2.

Diagnostic device 6 according to the present invention includes a comparator 7 as well as an output unit 8.

In the following, the method according to the present invention is described in greater detail on the basis of the block diagram in FIG. 2.

A vehicle impact typically produces an acceleration (or velocity or pressure) in the x-(201) and y-(202) direction. Should a vehicle impact occur, these accelerations are detected by at least one of sensors 3 to 5. These accelerations in the x-direction and y-direction are each integrated (203, 204) into a velocity (degraded vehicle velocity DV), and a mean value is generated therefrom. This so-called degraded velocity DV or its mean value usually is used as measure for the impact severity.

The installed and remote sensors 3 through 5 thus supply control unit 2 with information regarding their mechanical loading (pressure or acceleration) as a result of a vehicle impact. During the vehicle impact, control unit 2 ascertains the respective integral and peak values of the measured signals. The data thus obtained are compared to adjustable thresholds, which ultimately leads to a triggering of a restraining means.

Furthermore, according to the present invention the degraded vehicle velocity, which is calculated from the maximum of the calculated x, y integrals of the measured acceleration, is utilized as a measure of the crash severity. These values for the crash severity are stored (206), for instance in a maximum amount memory. Following a vehicle impact, the content of the maximum-amount memory may be compared (208) to a threshold specified by the vehicle manufacturer, which was determined in crash tests, for instance, which are conducted anyway. This comparison is implemented in comparator 7. If the predefined threshold is exceeded, control unit 2 or diagnostic device 6 will generate an error signal (210), which is indicated to the vehicle user in the form of a warning light 8, for example. In addition or as an alternative, this error-function signal may also be read out in a service facility by a service-facility testing device. Therefore, if a function-error signal is output, this indicates that airbag control unit 2 and/or the respective sensors 3 to 5 must be exchanged. If the maximum amount remains below the predefined threshold, and if control unit 2 or sensors 3 to 5 exhibit no faults in an internal self-test, the individual device may remain in the vehicle since it is considered fully functional.

In this way vehicle manufacturers are able to define a threshold (such as DV=30 km/h) at which control unit 2 should be replaced. Either in addition or as an alternative, each individual external sensor 3 to 5 may be tested using similar calculations, either in addition or as an alternative. Airbag control unit 2 may therefore decide for itself and for each remote sensor 3 through 5 whether a replacement is warranted after a vehicle impact.

Although the present invention has been described above on the basis of the aforementioned preferred exemplary embodiment, it is not limited thereto, but may be modified in various ways.

For instance, as illustrated in the exemplary embodiment in FIG. 3, diagnostic device 6 according to the present invention may also be implemented in control unit 2. Furthermore, comparator 7 and/or output unit 8 need not necessarily be included in diagnostic device 6, but may also be installed at some other location in the vehicle.

Finally, the present invention is not limited to the number of control units 2 or sensors 3 to 5 shown in FIGS. 1 and 3, but may be expanded to any number of such devices 2 to 5.

What is claimed is:

1. A method for monitoring, via a diagnostic device, a performance reliability of at least one of a control unit and at least one sensor of a safety device for protecting a vehicle occupant, the diagnostic device being arranged in a motor vehicle together with the control unit and the at least one sensor and the diagnostic device including an arrangement for coupling to the at least one sensor of the safety device, comprising the steps:
   a) recording, via the coupling, an impact;
   b) deriving a value for an impact severity from the impact;
   c) comparing, by a comparator of the diagnostic device that provides a predefined threshold value for a proper functioning of the at least one of the control unit and the at least one sensor, the value for the impact severity to the predefined threshold value; and
   d) outputting, by an output device of the diagnostic device, an error-function signal in the event that the value for the impact severity exceeds the predefined threshold value, the error-function signal indicating that a proper functioning is no longer ensured for the at least one of the control unit and the at least one sensor;
   wherein the predefined threshold value is lower than a threshold value provided for a triggering of a restraining arrangement assigned to the at least one of the control unit and the at least one sensor.

2. The method as recited in claim 1, further comprising:
   calculating the value for the impact severity for each of the at least one of the control unit and the at least one sensor; and
   comparing each calculated value to a respective predefined threshold value for each of the at least one of the control unit and the at least one sensor.

3. The method as recited in claim 1, wherein one of (a) the deriving of the value for the impact severity and (b) a setting of the predefined threshold value is based on information from a plurality of impacts that occur over time.

4. The method as recited in claim 1, further comprising:
   lowering the predefined threshold value with an increasing operating time of the safety device.

5. The method as recited in claim 4, wherein the lowering of the predefined threshold value includes providing an absolute value representation of the predefined threshold value, and decreasing the absolute value representation of the predefined threshold value.

6. The method as recited in claim 1, further comprising:
   determining the predefined threshold value from at least one of a crash test and one of calculations and findings derived therefrom.

7. The method as recited in claim 1, further comprising:
   implementing a read-out and an analysis of an output error-function signal by at least one of the control unit and a service facility testing device.

8. The method as recited in claim 1, wherein the impact is recorded by recording a value corresponding to at least one of a negative acceleration, a velocity, and a pressure caused by the impact.

9. A diagnostic device for monitoring a performance reliability of at least one of a control unit and a least one sensor of a safety device for protecting a vehicle occupant, comprising:
   an arrangement for coupling to the at least one sensor of the safety device to record an impact, the diagnostic device being arranged in a motor vehicle together with the control unit and the at least one sensor;
   a comparator that provides at least one predefined threshold value for a proper functioning of the at least one of the control unit and the at least one sensor, the comparator comparing a value for an impact severity derived from the impact to the predefined threshold value; and
   an output device that outputs an error-function signal in the event that the value for the impact severity exceeds the at least one predefined threshold value, the error-function signal indicating that a future proper functioning is no longer ensured for the at least one of the control unit and the at least one sensor;
   wherein the predefined threshold value is lower than a threshold value provided for a triggering of a restraining arrangement assigned to the at least one of the control unit and the at least one sensor.

10. The diagnostic device as recited in claim 9, wherein a functionality of the diagnostic device is implemented in the control unit, either entirely or partially.

11. The diagnostic device as recited in claim 9, wherein, for each one of the at least one of the control unit and the at least one sensor, a respective threshold value is predefined that is typical for one of the control unit and the at least one sensor.

* * * * *

UNITED STATES PATENT AND TRADEMARK OFFICE
CERTIFICATE OF CORRECTION

PATENT NO. : 7,584,035 B2  
APPLICATION NO. : 10/553502  
DATED : September 1, 2009  
INVENTOR(S) : Peter Meissner It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 677 days.

Signed and Sealed this

Fourteenth Day of September, 2010

David J. Kappos  
*Director of the United States Patent and Trademark Office*